March 29, 1966 J. J. C. L. DE LEERS 3,243,647

VERTICAL DEFLECTION AND BLANKING CIRCUIT

Filed Aug. 27, 1962

Inventor
JOZEF J. C. L. DE LEERS
By [signature]
Attorney

United States Patent Office 3,243,647

Patented Mar. 29, 1966

3,243,647
VERTICAL DEFLECTION AND BLANKING CIRCUIT

Jozef Jan Celestijn Lodewijk De Leers, Antwerp, Belgium, assignor to International Standard Electric Corporation, New York, N.Y., a corporation of Delaware Filed Aug. 27, 1962, Ser. No. 219,657
Claims priority, application Netherlands, Sept. 4, 1961, 268,907
20 Claims. (Cl. 315—22)

The invention relates to a circuit for the picture tube of a television set and more particularly to an improved deflection circuit for the picture tube of a television set. Dutch Patent No. 90,070 discloses a vertical deflection circuit for the picture tube of a television set including a vertical deflection coil for the picture tube, an output amplifying device having a control electrode circuit and an output electrode circuit, an output transformer having its primary winding coupled to the output electrode circuit and a secondary winding coupled to the vertical deflection coil, and a capacitor coupled to the control electrode circuit to produce a control voltage for application to the control electrode of the amplifying device. The control voltage is produced by periodically charging and discharging the capacitor in a charging circuit comprising a series resistance, a third winding on the output transformer, and a voltage source. Thus, in accordance with this circuit the output transformer normally comprises three windings which are necessary to produce a suitable control current, for instance, having a sawtooth shape, in the vertical deflection coil.

It is also known in the art that it is preferable to apply vertical blanking pulses to the first accelerating anode of the picture tube of a television set when this set can receive both positively and negatively modulated television signals.

In the past the vertical blanking pulses have been produced by providing a fourth or additional winding on the output transformer of the above described unit. The necessary blanking pulses are produced across this additional winding and coupled to the first accelerating anode of the picture tube.

Hence, by providing the additional winding the dimensions and the price of the output transformer and consequently the price of the television set will increase.

It is therefore a main object of the present invention to provide a circuit of the above type which is adapted to produce vertical blanking pulses without complicating the construction of the output transformer, that is, without requiring the fourth or additional winding on the output transformer.

The circuit according to the invention includes a third winding comprising a considerable number of turns relative to the number of turns of the third winding of the above described prior art circuit and is used as the blanking winding.

The circuit according to the invention further including voltage dividing means in shunt relation to the third winding so that only a part of the voltage developed across the third winding is applied through the resistor of the charging circuit to the capacitor for producing the control voltage coupled to the control electrode of the above described prior art amplifying device, and one end of the third winding being grounded with respect to alternating current and the other end of the third winding being coupled by means of a high impedance network to an accelerating anode of the picture tube.

The above mentioned and other objects and features of the invention will become more apparent and the invention itself will be best understood by referring to the following description of embodiments taken in conjunction with the accompanying drawings wherein.

Figures 1, 2:
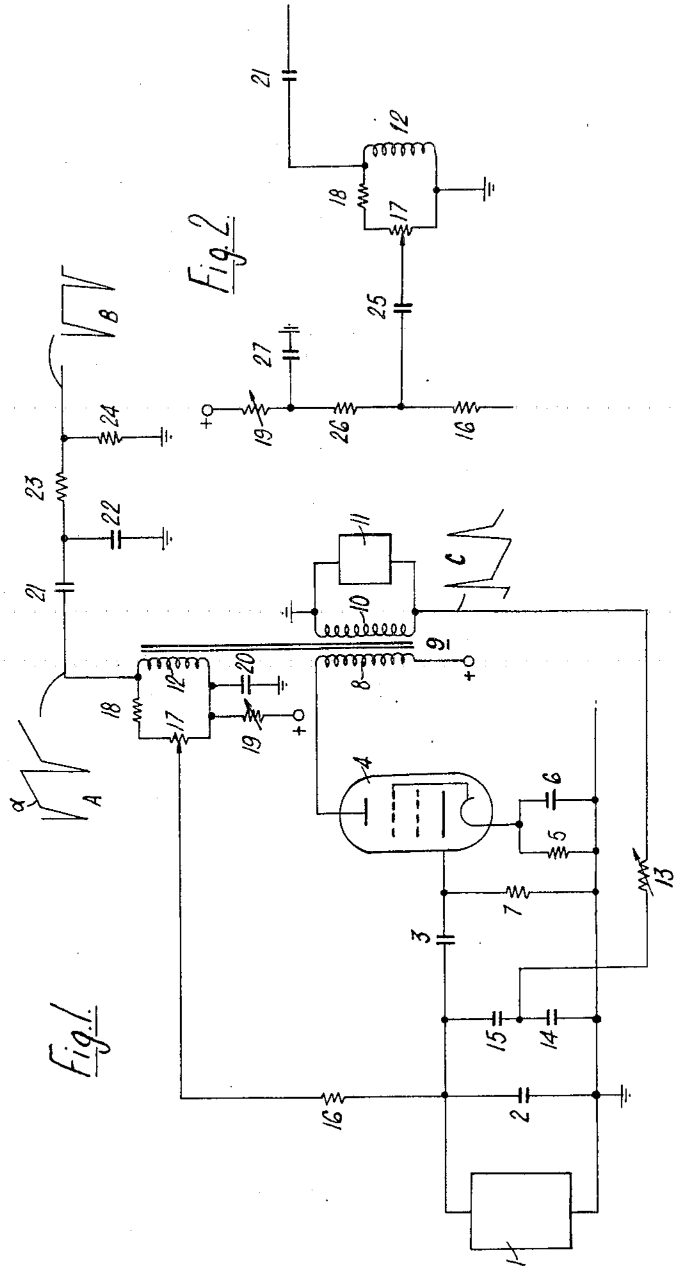
FIG. 1 shows a first embodiment of the circuit according to the invention.
FIG. 2 represents a part of another embodiment of the circuit according to the invention.

In FIG. 1, rectangle 1 represents a periodically operating switching device, for instance, a blocking oscillator, which is able to periodically discharge capacitor 2. This capacitor is connected in series with capacitor 3 and forms part of the control electrode circuit of tube 4. Between the cathode of tube 4 and ground is coupled the usual parallel circuit including resistor 5 and a capacitor 6. This parallel circuit produces a negative grid bias voltage which is applied to the control grid of tube 4 by means of resistor 7. The anode circuit of tube 4 comprises primary winding 8 of transformer 9 and vertical deflection coil 11 of a picture tube of a television set shunted across secondary winding 10 of transformer 9. Transformer 9 is further provided with a third winding 12. One end of secondary winding 10 is grounded and the other end of winding 10 is connected by variable resistance 13 to the junction point of the two series connected capacitors 14 and 15 which are coupled in parallel across capacitor 2. Capacitor 2 is included in a charge circuit including the series connection of resistor 16, the parallel connection of one part of potentiometer 17 and the other part of potentiometer 17 in series with resistor 18 and winding 12, variable resistor 19 and a voltage source. One end of winding 12 is grounded by a capacitor 20 having a large capacity value and the other end of winding 12 is coupled to the first accelerating anode of the picture tube by a network which is constituted by capacitors 21, 22 and resistors 23, 24.

It is well known in the art that a compensation of the voltage across capacitor 2 is obtained by means of the positive feedback produced by winding 12 which is wound in the suitable sense. In the present case winding 12 comprises a considerable number of turns relative to the number of turns of the third winding of the above described prior art so that a considerable voltage is developed thereacross. Since such a considerable voltage is not necessary for producing said compensation, a potentiometer 17 is coupled across winding 12 to enable the control of the degree of positive feedback. In this manner it is, for instance, possible to modify the voltage across capacitor 2 in such a manner that it varies substantially linearly, or more than linearly with time. This voltage can also be given such a form that the upper part thereof is shaped as the upper part of an S. As is well known in the art, this is desirable when the picture tube is provided with a flat screen. In this manner the line distance in the lower part of the image produced is correctly adjusted.

The upper part of the image can be influenced in the usual way by controlling the negative feedback produced by integrating network 13, 14 which integrates pulses C. A parabolic-shaped voltage is then produced across capacitor 14 and is added to the voltage produced across capacitor 2, by capacitor 15.

As mentioned above winding 12 comprises a considerable number of turns, for instance, from one third to one half of the number of turns of primary winding 8. The reason for the large number of turns is that winding 12 is used as the blanking winding to produce blanking pulses of a considerable voltage thereacross for coupling to the first accelerating anode of the picture tube.

Next to this first requirement other conditions must, however, be fulfilled. Since pulses having a voltage as large as possible must be produced across winding 12, the suitable end thereof, i.e. the end with the suitable phase, is grounded with respect to alternating current.

This is done by capacitor 20 having a large capacity value. Since winding 12 also forms part of the charge circuit of capacitor 2, any load on winding 12 must be held small. This is realized by connecting winding 12 to the first accelerating anode of the picture tube by a differentiating network including capacitor 21 of, e.g., 5,000 picofarads and resistor 24 of, e.g., 270 kilo-ohms. By means of this differentiating network, the raising parts *a* of blanking pulses A are smoothed and blanking pulses B are obtained. The raising parts *a* of pulses A have the drawback of producing brightness which increases from the lower to the upper part of the television picture.

Also when horizontal blanking pulses are applied to the first accelerating anode a filter network has to be coupled between this anode and winding 12 in order to prevent the horizontal blanking pulses from influencing winding 12. This network includes resistor 23 of, e.g., 82 kilo-ohms and capacitor 22 of, e.g., 270 picofarads. The above resistors 23, 24 constitute a voltage divider which would tend to dampen the pulses A before they reach the first anode of the picture tube. This is another reason why pulses A must have a considerable voltage, the voltage developed across winding 12.

It should further be noted that resistor 16 and capacitor 2 constitute a supplementary decoupling circuit and prevent the horizontal blanking pulses from reaching the switching device 1.

Instead of applying the compensation voltage from winding 12 to capacitor 2 in the manner shown in FIG. 1, compensation voltage may also be provided as shown in FIG. 2. Therein one end of winding 12 is directly grounded. Resistor 16 is connected on the one hand to the sliding contact of potentiometer 17 by a capictor 25 having a large capacity value and on the other hand to the variable resistor 19 by resistor 26. The junction point of the latter resistors is grounded by capacitor 27 having a large capacity value. It is clear that a part of the voltage across the winding 12, namely, the voltage between ground and the sliding contact of potentiometer 17, is applied to resistor 26.

While the principles of the invention have been described above in connection with specific apparatus, it is to be clearly understood that this description is made only by way of example and not as a limitation on the scope of the invention.

I claim:

1. A circuit for the picture tube of a television set comprising:
   an amplifying device including
      an output electrode and
      a control electrode;
   a transformer including
      a first winding coupled to said output electrode,
      a second winding coupled between said first winding and the deflection coil of said picture tube, and
      a third winding coupled to said first and second windings, said third winding having a predetermined number of turns to produce thereacross pulses of given magnitude to provide blanking pulses;
   first means coupled to said third winding to couple to said blanking pulses to an accelerating anode of said picture tube;
   a first capacitor coupled to said control electrode;
   second means coupled across said third winding to reduce said given magnitude;
   a charging circuit including a first resistor coupled between said capacitor and said second means, and a voltage source coupled to said second means; and
   third means coupled to said capacitor to periodically discharge and charge said capacitor in said charging circuit to produce a control voltage for said amplifying device and a predetermined deflection current for the deflection coil of said picture tube.

2. A circuit according to claim 1, wherein said first means includes a high impedance network.

3. A circuit according to claim 2, wherein said high impedance network includes a differentiating network.

4. A circuit according to claim 1, wherein said second means includes a voltage divider coupled in shunt relation across said third winding.

5. A circuit according to claim 4, wherein said voltage divider includes a second resistor and a potentiometer coupled in series.

6. A circuit according to claim 5, wherein said first resistor is coupled in series with the sliding contact of said potentiometer.

7. A circuit according to claim 1, wherein one end of said third winding is capacitively coupled to ground and said first means couples the other end of said third winding to an accelerating anode of said picture tube.

8. A circuit according to claim 7, wherein said first means includes a high impedance network.

9. A circuit according to claim 8, wherein said high impedance network includes a differentiating network.

10. A circuit according to claim 7, wherein
   said second means includes
      a series circuit having
         a second resistor and
         potentiometer; and
   said voltage source is coupled to said one end of said third winding.

11. A circuit according to claim 1, wherein
   said second means includes
      a series circuit having
         a second resistor and
         a potentiometer;
   one end of said third winding being directly coupled to ground and said first means couples the other end of said third winding to an accelerating anode of said picture tube;
   a second capacitor coupled between the sliding contact of said potentiometer and said first resistor;
   a third resistor having one end thereof coupled to the junction of said second capacitor and said first resistor;
   a third capacitor coupling the other end of said third resistor to ground; and
   means coupling said voltage source to the junction of said third resistor and said third capacitor.

12. A circuit according to claim 1, further comprising
   means to directly ground one of said second winding; and
   a negative feedback circuit coupled between the other end of said second winding and said control electrode.

13. A circuit according to claim 12, wherein said negative feedback circuit includes an integrating circuit.

14. A circuit according to claim 12, wherein said first means includes a high impedance network.

15. A circuit according to claim 14, wherein said high impedance network includes a differentiating network.

16. A circuit according to claim 12, wherein said second means includes a voltage divider coupled in shunt relation across said third winding.

17. A circuit according to claim 16, wherein said voltage divider includes a second resistor and a potentiometer coupled in series.

18. A circuit according to claim 17, wherein said first resistor is coupled in series with the sliding contact of said potentiometer.

19. A circuit according to claim 12, wherein
   one end of said third winding is capacitively coupled to ground and said first means couples the other end of said third winding to an accelerating anode of said picture tube;
   said second means includes
      a series circuit having
         a second resistor and
         a potentiometer; and said voltage source is coupled to said one end of said third winding.

20. A circuit according to claim 12, wherein
said second means includes
a series circuit having
a second resistor and
a potentiometer;
one end of said third winding being directly coupled to ground and said first means couples the other end of said third winding to an accelerating anode of said picture tube;
a second capacitor coupled between the sliding contact of said potentiometer and said first resistor;
a third resistor having one end thereof coupled to the junction of said second capacitor and said first resistor;

a third capacitor coupling the other end of said third resistor to ground; and
means coupling said voltage source to the junction of said third resistor and said third capacitor.

References Cited by the Examiner

UNITED STATES PATENTS

| | | | |
|---|---|---|---|
| 2,874,329 | 2/1959 | Janssen et al. | 315—27 |
| 2,994,802 | 8/1961 | Shelby | 315—22 |

DAVID G. REDINBAUGH, *Primary Examiner.*

J. A. O'BRIEN, T. A. GALLAGHER,
*Assistant Examiners.*